E. H. GOLD.
HOSE COUPLING.
APPLICATION FILED APR. 22, 1916.

1,202,993.

Patented Oct. 31, 1916.

INVENTOR.
Robert H Gold
BY
Barnett Numan
ATTORNEYS.

UNITED STATES PATENT OFFICE.

EGBERT H. GOLD, OF CHICAGO, ILLINOIS.

HOSE-COUPLING.

1,202,993.  Specification of Letters Patent.  Patented Oct. 31, 1916.

Application filed April 22, 1916. Serial No. 92,988.

*To all whom it may concern:*

Be it known that I, EGBERT H. GOLD, a citizen of the United States, residing at Chicago, in the county of Cook and State of Illinois, have invented certain new and useful Improvements in Hose-Couplings, of which the following is a specification.

My invention relates to hose couplings, more especially to railway train pipe couplings of the gravity type in which the mating coupler heads are coupled and uncoupled by a rocking movement. In a hose coupling of this type the mating faces of the gaskets, when, as is customary, the gaskets are rigidly seated in the coupler heads, are likely to be worn and frayed at the places at which one gasket rocks upon the other. Any such fraying or wear causes the coupling to leak and requires the replacement of the gasket which is a matter of some expense and considerable inconvenience. It is also a fact that the mating faces of coupler gaskets (and the same would be true of couplers other than those of the gravity type) are not always in perfect contact due to imperfections in the gaskets or in the seats formed for them in the coupler heads. The improper alinement of the gasket meeting faces will, obviously, cause a gasket to leak.

The object of my invention is to provide an arrangement of the gasket in the coupler which will not involve these objectionable features. To this end a gasket holder, adapted to support a gasket of ordinary construction, is provided which has a ball and socket relationship with the coupler head. The gasket is seated in the gasket holder after the latter has been put in place in the coupler head and is so disposed that it keeps the gasket holder in proper position in the coupler head allowing it, however, sufficient rocking movement so that the gasket will automatically seat itself against the meeting face of the complementary coupler head.

The invention is illustrated, in a preferred embodiment, in the accompanying drawing wherein—

Figure 1:
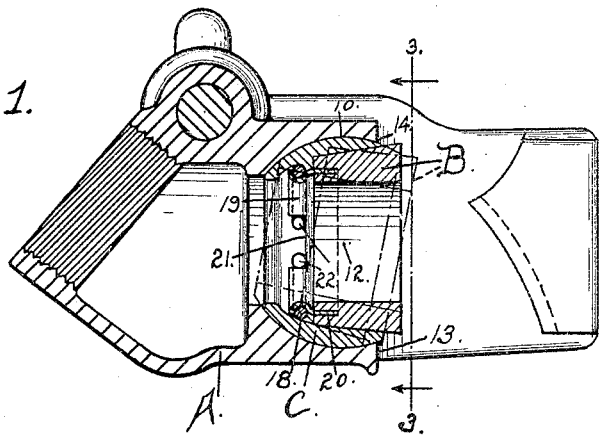
Figure 2:
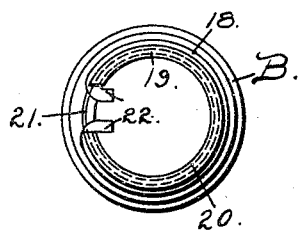
Figure 3:
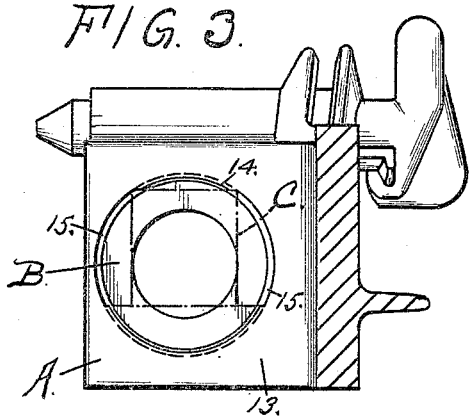
Figure 4:
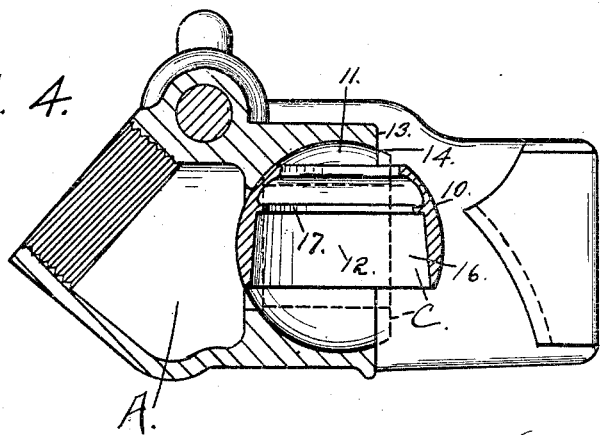

Figure 1 is a longitudinal sectional view of a coupler head provided with the gasket holding arrangement of my invention. Fig. 2 is a detail view of the inner end of the gasket showing the device employed for engaging the gasket with the gasket holder. Fig. 3 is a sectional view on line 3—3 of Fig. 1. Fig. 4 is a view similar to Fig. 1 to illustrate the manner in which the gasket holder and gasket are assembled in the coupler head.

Like characters of reference designate like parts in the several figures of the drawing.

Referring to the drawing, A indicates a coupler head of ordinary construction, and B a gasket which is also of a sort commonly used.

C is a gasket holder, the outer surface 10 of which is spherical in its contour in conformity with the bounding surface of a socket 11 formed in the coupler head A. The center 12 from which the surface 11 is struck is within the face 13 of the coupler head and in order to permit the gasket holder to be inserted into the socket the rim portion 14 of the latter which overhangs the gasket holder, when the latter is in place, is cut away on opposite sides of the opening into the socket for distances equal to the width of the gasket holder when turned on edge, as indicated at 15, 15. The gasket holder is inserted edgewise through the enlargements 15, 15, as shown in dotted lines in Fig. 3 and in full lines in Fig. 4, and is then turned into its operative position as shown in Fig. 1. The gasket holder is formed with a recess 16 in which the gasket B is seated, and with a rib 17 adapted to be engaged by a locking ring 18 which lies in the grooved portion 19 of a circular metallic element 20 with which the inner end of the gasket is provided. The grooved portion 19 of this metallic element is cut away, as indicated at 21, and through this opening project the ends 22 of the locking ring. By this means the locking ring may be contracted so as to clear the rib 17 of the gasket holder when the gasket is to be removed from the holder or when it is to be inserted therein. Any other suitable means might be employed for engaging the gasket with the gasket holder.

When the gasket is in place in the holder it projects beyond the front face of the latter as shown and thereby prevents the holder from being turned far enough to permit its disengagement from the coupler head. So long as the gasket remains in place there is no danger that the gasket holder will fall from the coupler head, as might otherwise occur at such times as the coupler in question is not in engagement with the coupler of another car.

I claim:

1. In combination, a hose coupler having a gasket seat, the bounding surface of which is spherical from a center within the plane of the opening of the seat, and a gasket-holding member adapted to be placed within said seat having an outer surface corresponding to the bounding surface of the seat, the overhanging edge of the seat being cut away the width of the gasket-holding member at oppositely disposed places to allow said member to be placed in and removed from the seat, and a gasket proper carried by said gasket-holding member and arranged so as to project beyond the outer face of said member and coupler, so as to engage said coupler and prevent the removal of said gasket-holder from said coupler.

2. In combination, a hose coupler having a gasket seat, the bounding surface of which is spherical from a center within the plane of the opening of the seat, and a gasket adapted to be placed within said seat comprising a gasket-holding member having an outer surface corresponding to the bounding surface of the seat, and a gasket proper carried by said holding member adapted, when applied, to prevent the removal of said holder from said coupler.

EGBERT H. GOLD.

Copies of this patent may be obtained for five cents each, by addressing the "Commissioner of Patents, Washington, D. C."